(12) United States Patent
Napierala (10) Patent No.: US 7,936,754 B2
(45) Date of Patent: May 3, 2011

(54) METHODS AND APPARATUS TO DYNAMICALLY STORE NETWORK ROUTES FOR A COMMUNICATION NETWORK

(75) Inventor: Maria Napierala, Ocean, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 75 days.

(21) Appl. No.: 12/333,949

(22) Filed: Dec. 12, 2008

(65) Prior Publication Data

US 2010/0150155 A1    Jun. 17, 2010

(51) Int. Cl.
*H04L 12/56* (2006.01)
(52) U.S. Cl. .................................. 370/390; 370/328
(58) Field of Classification Search .................. 370/254, 370/392, 248, 255, 352, 225, 235; 709/242
See application file for complete search history.

(56) References Cited

U.S. PATENT DOCUMENTS

| | | | | |
|---|---|---|---|---|
| 5,519,704 | A * | 5/1996 | Farinacci et al. | 370/402 |
| 5,570,366 | A * | 10/1996 | Baker et al. | 370/312 |
| 5,963,540 | A | 10/1999 | Bhaskaran | |
| 5,982,745 | A * | 11/1999 | Wolff et al. | 370/219 |
| 6,363,054 | B1 * | 3/2002 | Saitoh | 370/248 |
| 6,707,810 | B1 * | 3/2004 | Neel et al. | 370/352 |
| 6,850,976 | B1 | 2/2005 | Xia | |
| 7,075,928 | B1 * | 7/2006 | Branth et al. | 370/390 |
| 7,126,949 | B2 | 10/2006 | Tingle et al. | |
| 7,158,497 | B2 * | 1/2007 | Li et al. | 370/331 |
| 7,272,643 | B1 | 9/2007 | Sarkar et al. | |
| 7,307,948 | B2 * | 12/2007 | Infante et al. | 370/225 |
| 7,561,517 | B2 * | 7/2009 | Klinker et al. | 370/235 |
| 7,561,549 | B2 * | 7/2009 | Meier et al. | 370/331 |
| 7,577,108 | B2 * | 8/2009 | Zhang et al. | 370/255 |
| 7,602,796 | B2 * | 10/2009 | Scudder et al. | 370/401 |
| 2002/0122394 | A1 * | 9/2002 | Whitmore et al. | 370/328 |
| 2002/0176430 | A1 * | 11/2002 | Sangha et al. | 370/412 |
| 2003/0110229 | A1 | 6/2003 | Kulig et al. | |
| 2004/0006640 | A1 * | 1/2004 | Inderieden et al. | 709/242 |
| 2004/0078625 | A1 | 4/2004 | Rampuria et al. | |
| 2004/0170181 | A1 * | 9/2004 | Bogdon et al. | 370/400 |
| 2005/0013242 | A1 | 1/2005 | Chen et al. | |

(Continued)

FOREIGN PATENT DOCUMENTS

JP    2006019775    1/2006

OTHER PUBLICATIONS

Rosen et al., "BGP/MPLS VPNs," RFC 2547, Network Working Group, Mar. 1999, 26 pages [retrieved from http://www.rfc-editor.org/rfc2547.txt].

(Continued)

*Primary Examiner* — Thong H Vu
(74) *Attorney, Agent, or Firm* — Hanley, Flight & Zimmerman, LLC (57) ABSTRACT

Example methods and apparatus to dynamically store network routes for a communication network are disclosed. A disclosed example method involves receiving data via a router having a first memory to store active routes and a second memory to store inactive routes. A destination address associated with the data is identified and in response to detecting that no destination address entry stored in the first memory matches the destination address associated with the data, a default route stored in the first memory is selected to forward the data using a multicast transport protocol.

17 Claims, 7 Drawing Sheets

U.S. PATENT DOCUMENTS

| | | |
|---|---|---|
| 2006/0056412 A1 | 3/2006 | Page |
| 2006/0159034 A1* | 7/2006 | Talur et al. .................... 370/254 |
| 2007/0019652 A1 | 1/2007 | Shand et al. |
| 2007/0104119 A1 | 5/2007 | Sarkar et al. |
| 2007/0121524 A1 | 5/2007 | Rangarajan et al. |
| 2007/0253416 A1 | 11/2007 | Raj |
| 2007/0258372 A1 | 11/2007 | Nadeau et al. |
| 2007/0274232 A1* | 11/2007 | Axelsson et al. ............. 370/254 |
| 2008/0107043 A1 | 5/2008 | Smith et al. |
| 2008/0137660 A1* | 6/2008 | Olakangil et al. ............ 370/392 |
| 2008/0170550 A1* | 7/2008 | Liu et al. ....................... 370/338 |
| 2008/0247399 A1 | 10/2008 | Hazard |
| 2008/0250492 A1 | 10/2008 | Hazard |
| 2009/0274153 A1* | 11/2009 | Kuo et al. ..................... 370/392 |

OTHER PUBLICATIONS

Rosen et al., "BGP/MPLS IP Virtual Private Networks (VPNs)," RFC 4364, Network Working Group, Feb. 2006, 48 pages [retrieved from http://tools.ietf.org/html/rfc4364].

Rosen et al., "Multicast in MPLS/BGP IP VPN's," draft-rosen-vpn-mcast-08.txt, Internet Draft, Network Working Group, Dec. 2004, [retrieved from http://tools.ietf.org/html/draft-rosen-vpn-mcast-08], 22 pages.

* cited by examiner

METHODS AND APPARATUS TO DYNAMICALLY STORE NETWORK ROUTES FOR A COMMUNICATION NETWORK

FIELD OF THE DISCLOSURE

The present disclosure relates generally to communication systems and, more particularly, to methods and apparatus to dynamically store network routes for a communication network.

BACKGROUND

Network service providers enable data communication services using networks interconnected via switches and routing devices including provider edge (PE) routers and customer edge (CE) routers. Customer edge routers communicatively couple customer equipment (e.g., computers and other processor systems, local routers, and local switches) to wide area networks (WANs) via PE routers. Provider edge routers are communicatively coupled to other PE routers across a WAN to enable communicating information between local CE routers and remote CE routers. To deliver data, each PE router is provided with routes that can be used to forward data packets based on destination addresses stored therein. A PE router stores each route in a routing table, and retrieves that route from the routing table each time the PE router receives a data packet having a destination address matching the destination address associated with that route.

As service providers expand their networks, additional routes are brought on line to enable data communications with the new portions of the network. Each time an additional route is created, PE routers to which that route is relevant must store the route in their routing tables. As the quantity of routes increase, so do the requirements for memory capacity to store those routes. Memory capacity for routing tables is typically increased in a network by adding additional routers. In this manner, each time a new router is added, its memory capacity is also added to the network to store additionally created routes. Thus, instead of having to store a single relatively long listing of routes in one router, installing another router enables storing a first portion of the route listing in a first router and storing a second portion of the route listing in the other router. The first router then handles data packets for which it has relevant routes in its stored portion of the route listing, and the other router handles data packets for which it has relevant routes in its stored portion of the route listing.

DETAILED DESCRIPTION

The example methods and apparatus described herein may be used to dynamically store network routes for a communication network. Network service providers implement communication networks using different network devices including service provider edge (PE) routers. Among other things, a PE router is responsible for storing network routes for different destination addresses to which data can be communicated. To store these different routes, a PE router is provided with a "fast" memory having relatively fast access speeds and that can be quickly accessed to route data at relatively high speeds. Such fast memory may be implemented using, for example, static random access memory (SRAM) and ternary content-addressable memory (TCAM). In addition, a PE is also provided with relatively slower memory that is used to store other information such as software and/or firmware. This relatively slower memory has relatively slower access speeds than the fast memory and can be implemented using, for example, dynamic RAM (DRAM).

The relatively faster memory is used for storing routes to enable a router to provide and maintain a relatively high data throughput. That is, when a router receives a data packet for delivery, the router must find the appropriate destination route for that data packet in its network route table. By storing the network route table in fast memory, the router can search the table and find the appropriate route relatively faster than if the network route table were stored in a slower memory. This enables the router to receive and forward data packets at relatively high speeds, thus providing high-speed data communications.

As networks are expanded to service new areas and provide additional features, the number of routes that each PE router must know increases. This increase in route quantities presents several challenges, among which include providing sufficient storage capacity at each PE router to accommodate the increased route quantities. Using traditional route storage techniques, the increased storage capacity would require adding additional "fast" memory storage capacity, which would require higher costs to either add more memory to existing router designs or add additional routers to a network. Fast memory such as SRAM or TCAM is significantly more expensive than slower memory such as DRAM. Thus, routers are typically configured to include less fast memory and relatively more slow memory. The fast memory is typically reserved for storing routing tables that are used to relatively quickly retrieve routes to deliver data packets while maintaining high data throughput rates. The slow memory is typically used for storing program memory.

Using the example methods and apparatus described herein, a PE router can be configured to accommodate the growing number of network routes while having substantially minimal or no effects on requirements for additional "fast" memory. In particular, the example methods and apparatus described herein can be used to configure routers to dynamically learn routes as they become active by storing those routes in fast memory on demand while storing a comprehensive listing of available and valid routes in slow memory when they are inactive (i.e., not immediately needed to forward data). An active route is a route to which data was recently or is currently being delivered. Each PE router includes at least one forwarding information base (FIB) in fast memory in which it stores routes. Using the example methods and apparatus, a PE router can be configured to store active routes as needed in its FIB. When a PE router receives data to be forwarded to a particular destination, if the route to that destination is not already stored in its FIB (e.g., because no recent previous communication has required that same destination), the PE router will program or store the route into its FIB. In this manner, the PE router can access the route in the FIB for any subsequent incoming data to be forwarded to the same destination.

When a PE router does not find a relevant route in its FIB for an initial data packet destined to a particular destination address, the PE router is configured to forward that initial data packet via a multicast transport protocol. In this manner, the data packet is flooded onto the network so that it can be delivered to its destination address. Substantially simultaneously or after forwarding the data packet via the multicast transport protocol, the PE router searches its relatively slower memory (e.g., a routing information base (RIB)) for a relevant route based on the data packets destination address and stores it in its FIB. When stored in the FIB, the route entry is a "native" FIB entry. For any subsequently received data packets destined to the same destination address, the PE router can then use the native route stored in the FIB to route those subsequently received data packets via a unicast transport protocol.

When routes are not active, they do not remain stored in fast memory. However, routes remain stored in the relatively slower program memory as each PE router has relatively more slow memory available than fast memory. In this manner, when a particular route is required to forward an incoming data packet, the route can be retrieved from slow memory and stored in fast memory to forward the data packet and any subsequent data packet associated with the same destination using, for example, a unicast transport protocol.

When an active route stored in the FIB has not been used for some time, the PE router detects this based on some measurable criterion. For example, a PE router may use a predetermined duration threshold to determine when to delete the route from the FIB to allocate fast memory storage space for subsequent active routes. In this manner, a PE router can dynamically learn and program routes into its FIB and recycle fast memory storage capacity by deleting unused routes to enable the PE router to handle data forwarding for an increased number of destination routes.

The example methods and apparatus described herein can be used in connection with different types of Internet Protocol Virtual Private Networks (IP VPNs), for example, multi protocol label switching/border gateway protocol VPNs (MPLS/BGP VPNs).

Figure 1:
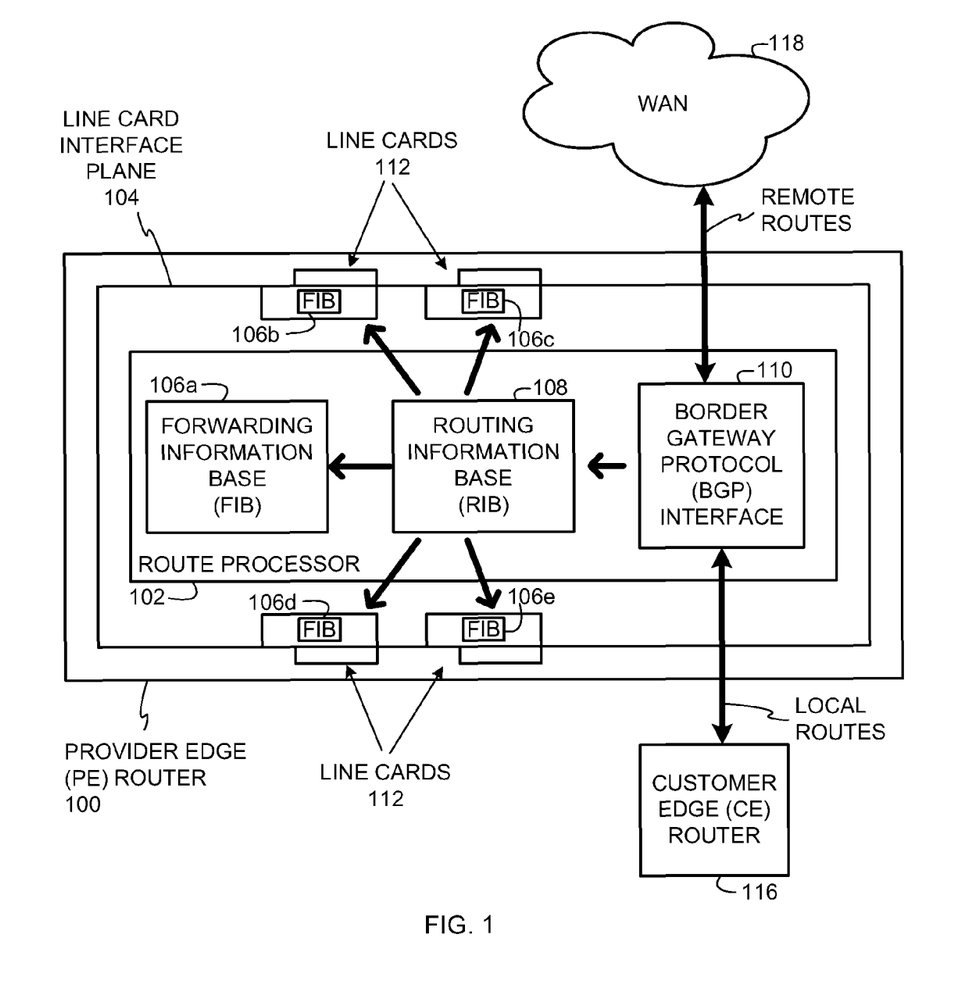
FIG. 1 is an example provider edge (PE) router that may be used to implement the example methods and apparatus described herein.

Turning to FIG. 1, an example provider edge (PE) router 100 that may be used to implement the example methods and apparatus described herein includes a route processor 102 and a line card interface plane 104. The example PE router 100 is configured to store active routes in one or more route cache data structures and inactive routes in one or more mass route storage data structures. To implement route cache data structures, the PE router 100 is provided with a plurality of forward information bases (FIBs) 106a-e. To implement mass route storage data structures, the PE router 100 is provided with a routing information base (RIB) 108 communicatively coupled to a border gateway protocol (BGP) interface 110. As shown in the illustrated example, the FIB 106a, the RIB 108, and the BGP interface 110 are provided in the route processor 102. In addition, the FIBs 106b-e are provided in line cards 112, which are communicatively coupled to the route processor 102 via the line card interface plane 104. In the illustrated example, the FIBs 106a-e can be implemented using relatively fast memory such as a SRAM or TCAM, and the RIB 108 can be implemented using a relatively slower memory such as a DRAM.

The BGP interface 110 communicatively couples the PE router 100 to a customer edge (CE) router 116 for local route communications and a wide area network (WAN) 118 for remote route communications. In the illustrated example, the PE router 100 and the CE router 116 can be used to implement one or more virtual private networks (VPNs) between customer equipment (e.g., networked computers or other network devices) across the WAN 118. The BGP interface 110 communicatively couples customer equipment to the BGP interface 110 and receives data packets from the customer equipment source nodes via the CE router 116 for delivery via remote routes across the WAN 118 to remote destination nodes. In addition, the BGP interface 110 receives data packets from destination nodes via the WAN 118 for delivery to local destination nodes via the CE router 116 using local routes.

Figure 2:
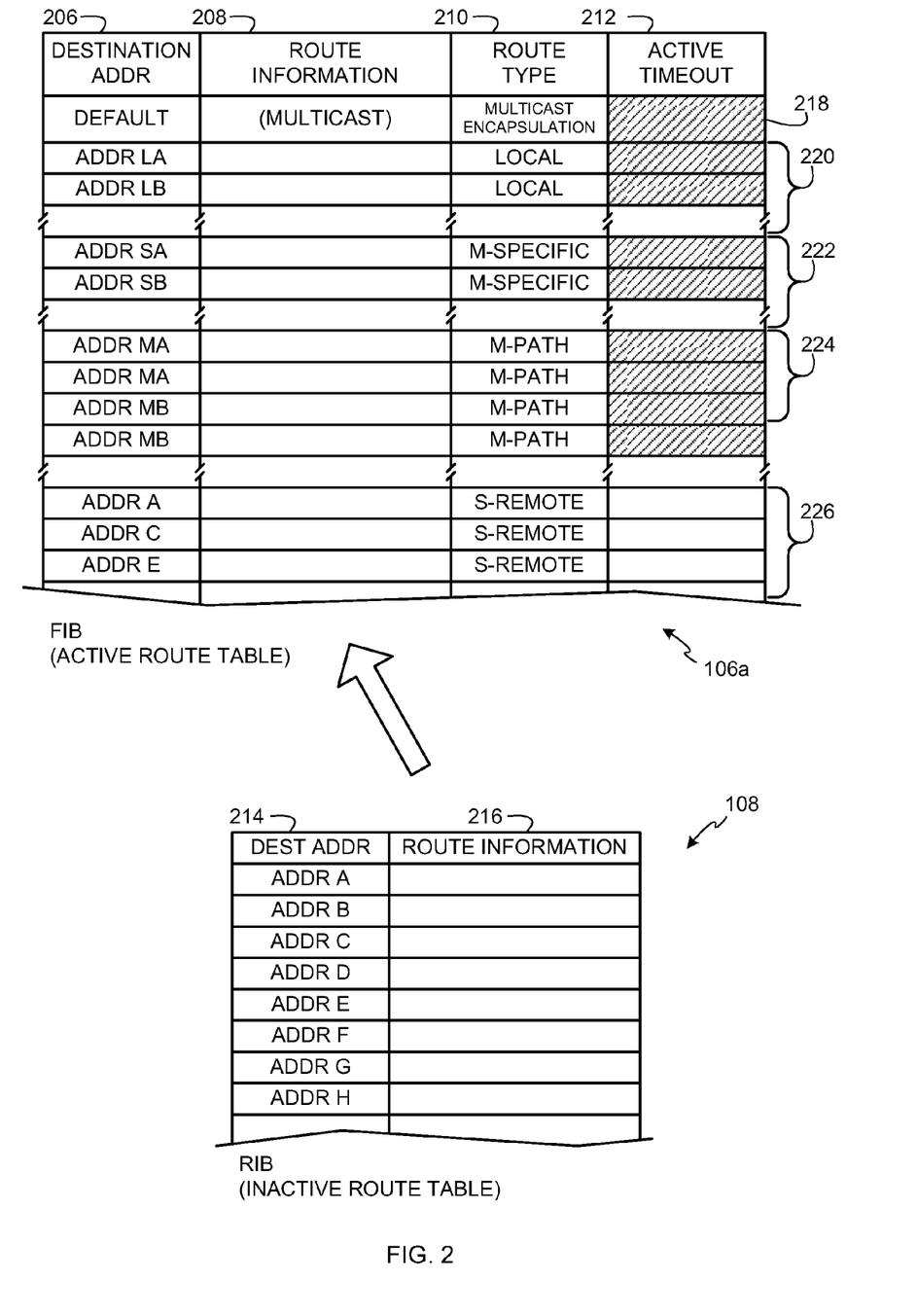
FIG. 2 illustrates example configurations that may be used to implement a forward information base (FIB) data structure and a routing information base (RIB) data structure of FIG. 1.

FIG. 2 illustrates example configurations that may be used to implement the forwarding information base (FIB) data structure 106a of FIG. 1 (e.g., an active route table) and the routing information base (RIB) data structure 108 of FIG. 1 (e.g., an inactive route table). The depicted configuration of the FIB 106a can be used to implement the other FIBs 106b-e of FIG. 1. In the illustrated example, the FIB 106a is shown as having a destination address column 206, a route information column 208, a route type column 210, and an active timeout column 212. The RIB 108 includes a destination address column 214 and a route information column 216. The example columns 202, 206, 208, 210, 212, 214, and 216, and their arrangements, are shown by way of example. In other example implementations more, less, or other types of columns may be provided and may have different arrangements.

In the illustrated example, the destination address columns 206 and 214 store destination addresses (e.g., destination internet protocol (IP) addresses) of destination nodes to which data (e.g., data received at the PE router 100 of FIG. 1) is to be delivered. The route information columns 208 and 216 include information used by a PE router (e.g., the PE router 100 of FIG. 1) to, for example, forward data to a next hop to deliver the data to its final destination. The route information columns 208 and 216 may also store other route information.

In the illustrated example, the route type column 210 of the FIB 106a is used to designate the type of route stored in each route entry. As shown, a first entry stores a default FIB entry 218, a first plurality of entries store local route type entries 220, a second plurality of entries store more-specific (m-specific) route type entries 222, a third plurality of entries store multi-path (m-path) route type entries 224, and a fourth plurality of entries store single-path remote (s-remote) route type entries 226.

In the illustrated example of FIG. 2, the default FIB entry 218 is pre-stored in the FIB 106a, and whenever the default FIB entry 218 is selected to forward a data packet, the PE router 100 is configured to encapsulate the packet in a multicast transport protocol and forward the data packet to its destination using a multicast transport protocol. An example multicast distribution tree that can be used to implement the multicast transport protocol is described below in connection with FIG. 3. In operation, when the PE router 100 receives a data packet, it searches the FIB 106a based on destination addresses in the destination address column 206 to determine whether it contains a native FIB route entry corresponding to a destination address of the data packet. If the PE router 100 determines that a corresponding route is not stored in the FIB 106a, the PE router 100 uses the default FIB entry 218 to forward the data packet to its destination address via a multicast transport protocol encapsulation. Substantially simultaneously or immediately afterward, the PE router 100 searches the RIB 108 for a corresponding route so that it can forward any subsequent data packet associated with the same destination address via a particular corresponding route. If the PE router 100 finds an appropriate route in the RIB 108 based on destination addresses in the destination address column 214, it stores the route in the FIB 106a as one of the single-path remote route entries 226.

The default FIB entry 218 is pre-stored in the FIB 106a and is not deleted therefrom or overwritten (as are the single-path remote routes 226 when they are no longer in use as discussed below). Pre-storing the default FIB entry 218 and using it as described above enables the PE router 100 to substantially immediately forward data packets for which no native routes are yet available in the FIB 106a while providing time to search the RIB 108 for an appropriate route with which to service any subsequent data packet associated with the same destination address and install that appropriate route in the FIB 106a. By installing the appropriate route entry in the FIB 106a, it becomes a native FIB entry. In some example implementations in which the PE router 100 needs an extended amount of time to find an appropriate route in the RIB 108, the PE router 100 may forward several initial data packets associated with the same destination address using the default FIB route entry 218 until the PE router 100 finds an appropriate single-path remote route and stores it in the FIB 106a or determines that a relevant route does not exist in its RIB 108.

When a data packet received at the PE router 100 and associated with a destination address for which no relevant route is stored in the FIB 106a, it may be an initial or first data packet of a communication stream and, thus, a plurality of other data packets associated with the same destination address is likely to follow. Although the PE router 100 is configured to forward the first data packet or the first several data packets associated with the same destination address using the default FIB entry 218, after the PE router 100 finds a corresponding single-path remote route and stores it in the FIB 106a, the PE router 100 forwards the subsequently received data packets via that single-path remote route using a unicast transport protocol.

The routes in the RIB 108 are updated as additional PE routers or destination nodes coupled to CE routers are installed in a network. The PE router 100 triggers an update to the FIB 106a whenever a new route is added to the RIB 108 for a particular destination prefix and that destination prefix has a native FIB entry already installed in the FIB 106a. However, the update trigger to the FIB 106a may be conditional based on whether the new route is a better route to the destination than the already stored native FIB entry. If the new route is better, then the FIB update trigger will occur causing the FIB 106a to be updated with the new route. This updating process is described below in connection with the flowchart of FIG. 6.

The local routes 220 are used to forward data from the PE router 100 of FIG. 1 to destination nodes coupled to the CE router 116 of FIG. 1. For example, when the PE router 100 receives a data packet from a source node via the WAN 118 for delivery to a destination node that is local to the PE router 100, the PE router 100 uses the destination address in the data packet to select one of the local routes in the local route type entries 220 to forward the data packet to its corresponding local destination node.

In the example implementations described herein, the local routes 220 are pre-stored in the FIB 106a to avoid dropping or discarding initial packets. If the local routes 220 were not pre-stored in the FIB 106a, the initial packets of a data stream or data communication to a locally attached destination/route would have to be dropped until a relevant route stored in the RIB 108 is programmed in the FIB 106a. Thus, by having the local routes 220 pre-stored in the FIB 106a, the PE router 100 can relatively immediately forward data packets to their designated local destinations. The local routes 220 are not deleted from the FIB 106a or overwritten so long as they are valid routes.

The more-specific routes 222 are used to forward data from the PE router 100 to destination nodes via routes that are defined more specifically relative to other more generally defined routes. For example, a route defined by its destination address prefix as 10/8 means that any data destined to an address starting with a first-octet prefix of '10' (i.e., 10.XXX.XXX.XXX) can be forwarded via a remote PE (e.g., PE1 (not shown)) over the 10/8 route. However, a more specific route definition of 10.1/16 would indicate that any data traffic destined to a destination address having a first and second-octet prefix of '10.1' (i.e., 10.1.XXX.XXX) can be forwarded over the 10.1/16 route via a different remote PE (e.g., PE2 (not shown)). In this manner, while data associated with a destination address prefix of '10.1' would be forwarded using the 10.1/16 route, all other data associated with a destination address having a first-octet prefix '10' (i.e., destination address 10.0.XXX.XXX, 10.2.XXX.XXX, 10.3.XXX.XXX, etc.) would be forwarded using the 10/8 route.

In the example implementations described herein, more-specific routes are pre-stored in the FIB 106a to enable the PE router 100 to avoid sub-optimal forwarding or miss-forwarding of packets. For example, if the PE router 100 received a data packet for which a more-specific route was defined (e.g., the more-specific route 10.1/16) and if the FIB 106a stored only a less specific route (e.g., the less specific route 10/8) while the more-specific route was stored in the RIB 108, the PE router 100 would forward the data packet using the less specific route already stored in the FIB 106a. This would result in mis-forwarding the data packet via the wrong route. Thus, to ensure that a less specific route is not erroneously selected when a more-specific route exists, the more-specific routes are pre-stored in the FIB 106a and are not deleted or overwritten so long as they are valid routes.

The multi-path routes 224 are used to forward data destined for a destination node that can be reached via two or more network paths. For instance, in the illustrated example of FIG. 2, two of the multi-path routes 224 exist for the destination address 'ADDR MA.' In the illustrated example, each of the multi-path routes associated with 'ADDR MA' involves a different PE router communicatively coupled to the PE router 100 of FIG. 1 to enable delivering data to the same destination address (e.g., the address 'ADDR MA'). If the PE router 100 receives data destined to the destination address 'ADDR MA,' it may select to forward the data to either of the PE routers capable of delivering the data. The PE router 100 may forward packets destined to 'ADDR MA' on both paths, if they are of equal cost (e.g., the routing cost or route metric). If the available paths to 'ADDR MA' are not of equal cost, the PE router 100 may select one of the two routes as the best route to forward packets to the destination. The PE router 100 may select the best route based on one or more parameters including, for example, least number of hops, higher preference, lower cost metric, etc.

In the example implementations described herein, multi-path routes are pre-stored in the FIB 106a to avoid duplicatively forwarding data packets having the same destination address. In particular, if the default FIB entry 218 were used to forward a data packet destined to a destination address for which multiple paths exist, the flooding of the data packet into a network via the multicast transport protocol (based on selection of the default FIB entry 218) would result in different destination networks receiving two or more of the same data packets. For example, if the PE router 100 multicasts a data packet to two PE routers capable of delivering the data packet to the same destination address, when the two PE routers receive the data packet, each will forward its copy of the data packet to the same destination. Thus, pre-storing the multi-path routes 224 in the FIB 106a prevents the PE router 100 from using the default FIB entry 218 to forward any data packets for which multi-path routes exist.

The single-path remote routes 226 are used to communicate data across a wide area network (e.g., the WAN 118 of FIG. 1). In the example implementations described herein, a single-path remote route may be moved between an active status and an inactive status. That is, when data is received at the PE router 100 and the data is associated with a single-path remote route, the example methods and apparatus described herein may be used to determine whether the route is already active and stored in the FIB 106a and, if not, to retrieve the route from the RIB 108 and store it in the FIB 106a. Even though single-path remote routes may be valid routes for communicating data to a device accessible via a network, when they are no longer needed for communicating data they may be deleted from the FIB 106a or overwritten to recycle or reallocate memory space in the FIB 106a for other subsequently active routes. That is, unlike the local routes 220, the more-specific routes 222, and the multi-path routes 224 which are pre-stored in the FIB 106a and cannot become inactive (i.e., they are not deleted from the FIB 106a or overwritten so long as they are valid routes), the single-path remote routes 226 can be dynamically stored in the FIB 106a when they are active and deleted from the FIB 106a or overwritten when they are inactive.

In the illustrated example, the active timeout column 212 of the FIB 106a is used to store status information indicative of whether routes are active. The active timeout column 212 can be used to store timer values or other status values that can be used to determine when single-path remote routes are no longer active and, thus, can be deleted from the FIB 106a or can be overwritten by subsequent active routes. For example, if a timer is used, when a single-path remote route is stored in the FIB 106a, its associated timeout timer will be reset. In addition, whenever that single-path remote route entry is used to forward a data packet, its associated timeout timer will also be reset. When the route entry has not been used for some predetermined duration equal to the timeout value, the timeout timer will expire indicating that the route entry is no longer active. When one of the single-path remote routes 226 becomes inactive, the PE router 100 can delete it from the FIB 106a or flag it as an overwriteable entry to allocate free memory space for subsequent active routes. As discussed above, the default route 218, the local routes 220, the more-specific routes 222, and the multi-path routes 224 will not be deleted or overwritten and, thus, are not subject to the active timeout process.

Figure 3:
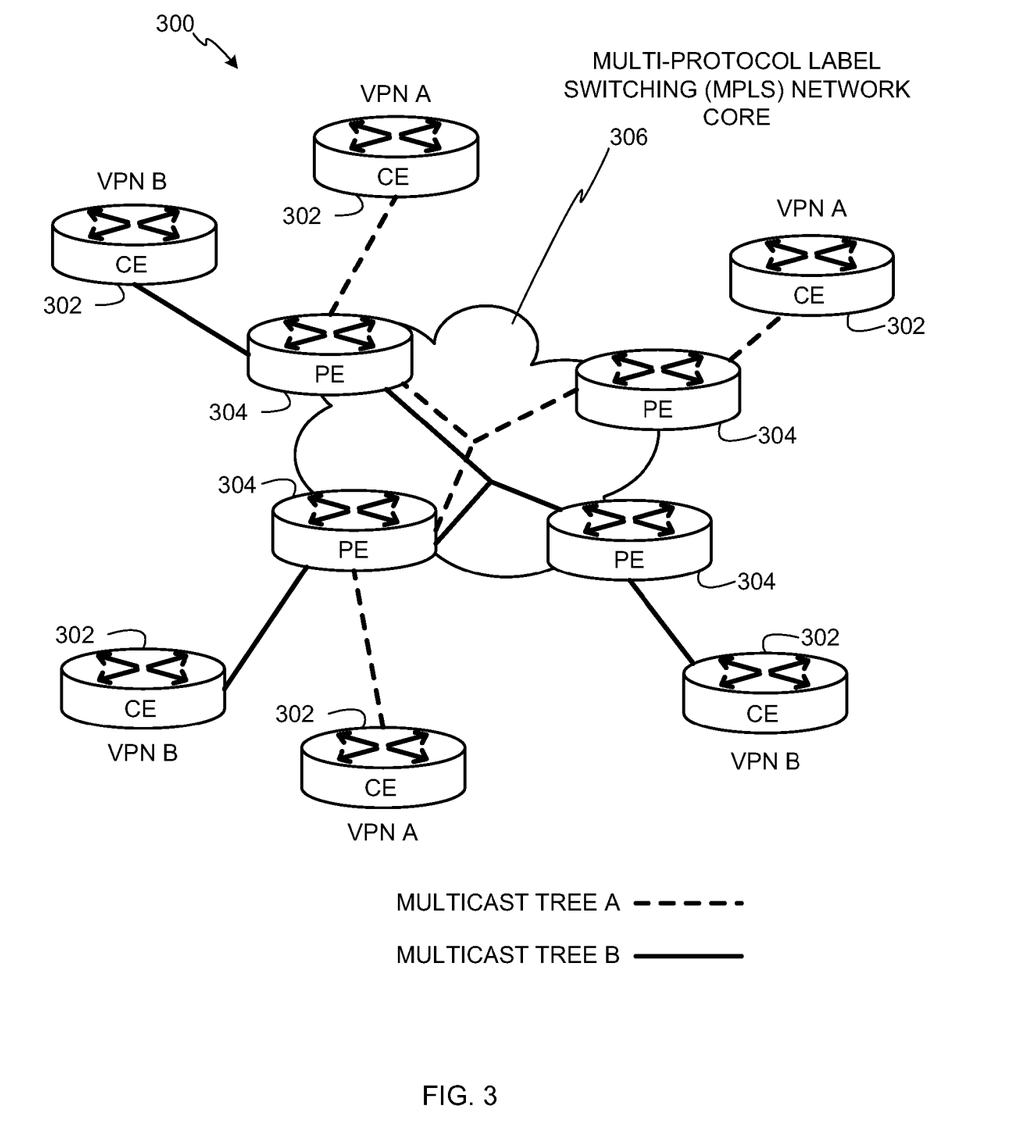
FIG. 3 depicts an example multicast distribution tree network that can be used to forward data packets using a multicast transport protocol.

FIG. 3 depicts an example multicast distribution tree network 300 that can be used to forward data packets using a multicast transport protocol. As discussed above in connection with FIG. 2, when the default FIB entry 218 of the FIB 106a is selected (in response to determining that a route corresponding to the data packet's particular destination address is not stored in the FIB 106a), the PE router 100 (FIG. 1) encapsulates a data packet in a multicast transport protocol encapsulation and forwards the data packet via a multicast distribution tree such as the multicast distribution tree network 300 of FIG. 3.

As shown in FIG. 3, the multicast distribution tree network 300 is formed using a plurality of CE routers 302 communicatively coupled to respective PE routers 304 in a multi-protocol label switching (MPLS) network core 306. In the illustrated example, the CE routers 302 and the PE routers 304 form two multicast trees: a multicast tree A and a multicast tree B. When any of the PE routers 304 participating in a multicast tree A (or B) forwards a data packet via a multicast transport protocol, the data packet is flooded onto the MPLS network 306 and received by every other one of the PE routers 304 on multicast tree A (or B). The receiving PE routers 304 that do not have a local route (e.g., one of the local route entries 220 of FIG. 2) in one of its FIBs to deliver the data packet will discard the data packet. However, a receiving one of the PE routers 304 having a corresponding local route will forward the data packet to its destination address via a corresponding one of the CE routers 302. In this manner, the data packet is forwarded to its intended destination address.

Figure 4:
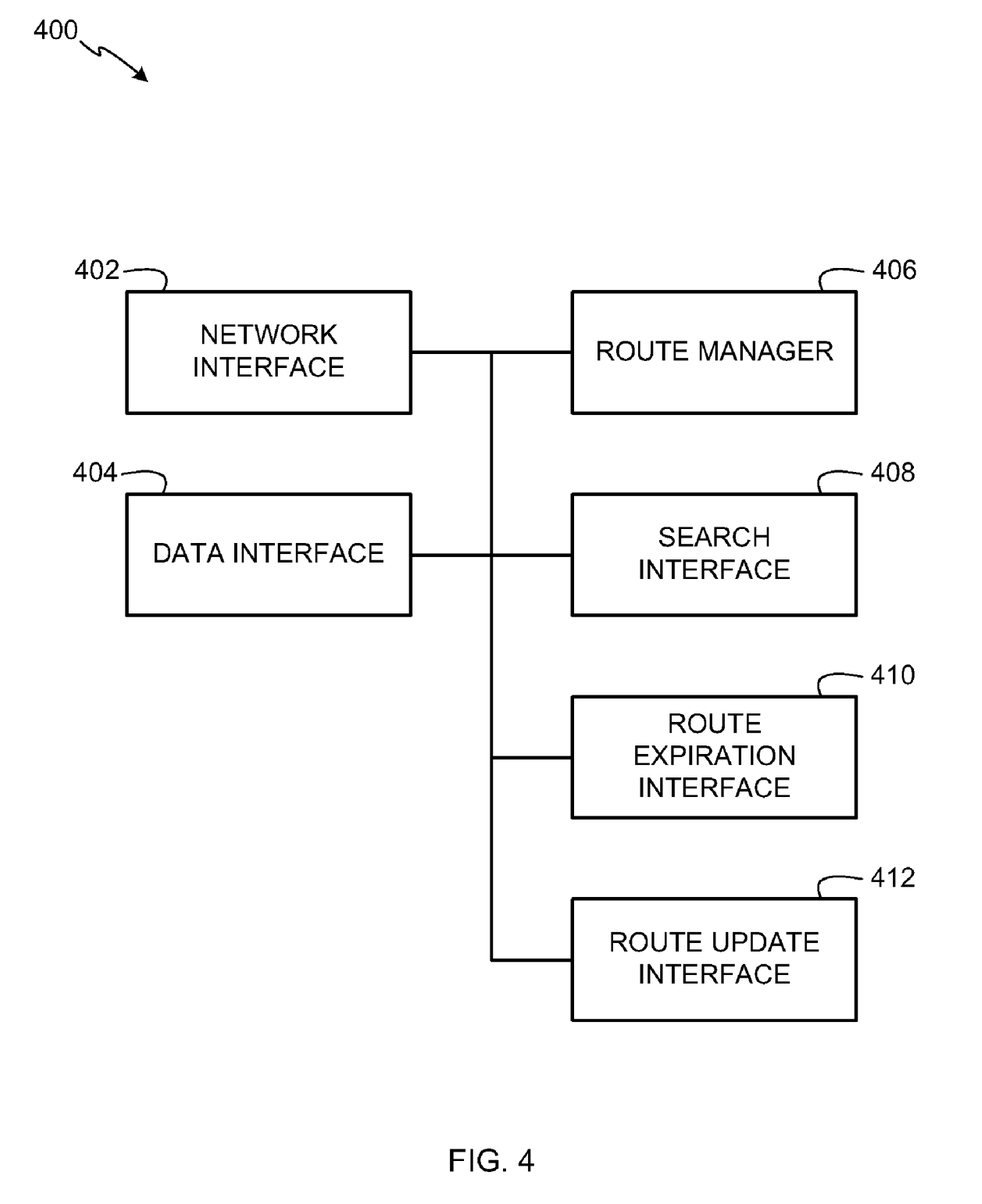
FIG. 4 is a block diagram of an example apparatus that may be used to implement a route processor and/or line cards of the example PE router of FIG. 1.

FIG. 4 is a block diagram of an example apparatus 400 that may be used to implement the route processor 102 and/or the line cards 112 of the example PE router 100 of FIG. 1. In the illustrated example, the example apparatus 400 includes a network interface 402, a data interface 404, a route manager 406, a search interface 408, a route expiration interface 410, and a route update interface 412. The example apparatus 400 may be implemented using any desired combination of hardware, firmware, and/or software. For example, one or more integrated circuits, discrete semiconductor components, and/or passive electronic components may be used. Thus, for example, any of the network interface 402, the data interface 404, the route manager 406, the search interface 408, the route expiration interface 410, and/or the route update interface 412, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 7:
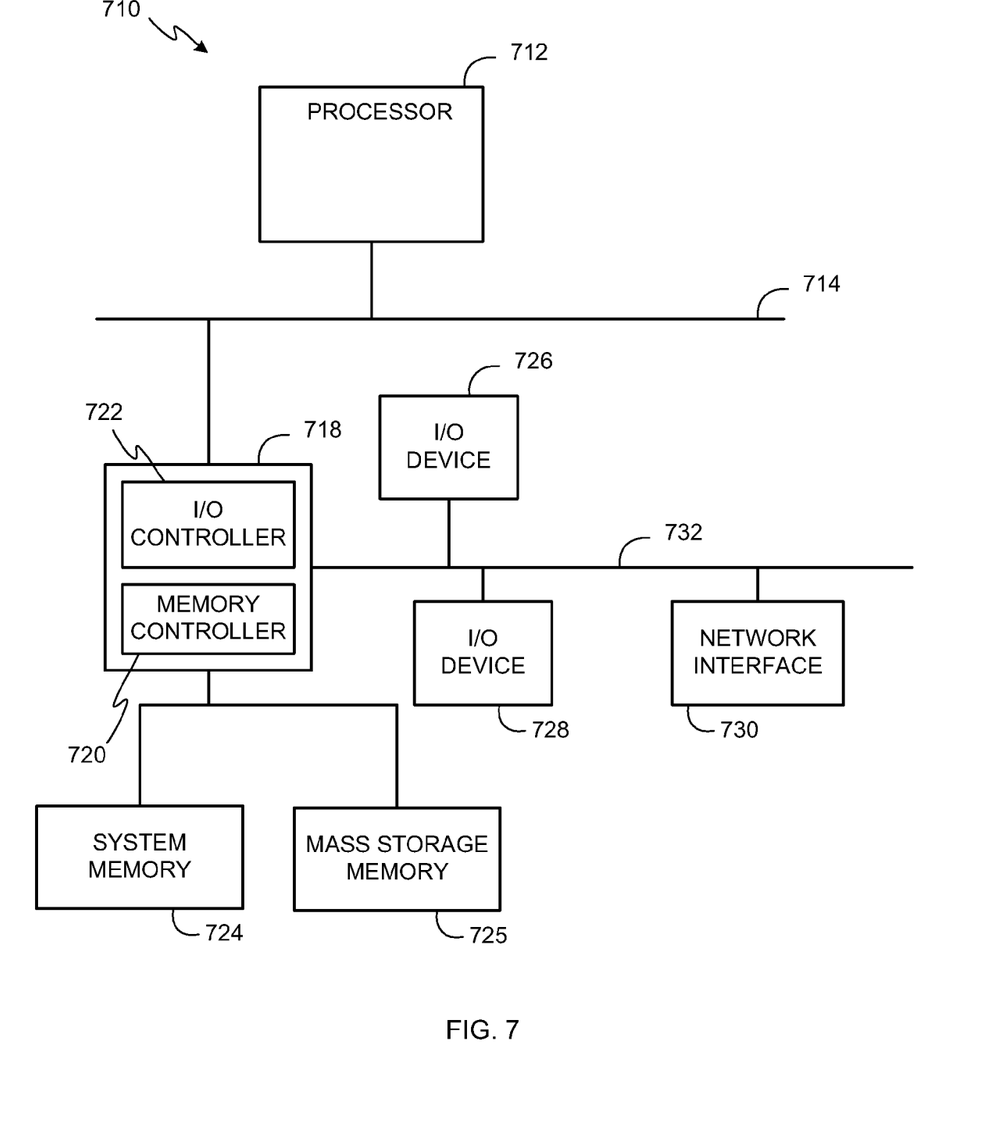
FIG. 7 is a block diagram of an example processor system that may be used to execute the example machine readable instructions of FIGS. 5 and/or 6 to implement the example apparatus of FIG. 4 and/or the example PE router of FIG. 1.

Some or all of the network interface 402, the data interface 404, the route manager 406, the search interface 408, the route expiration interface 410, and/or the route update interface 412, or parts thereof, may be implemented using instructions, code, and/or other software and/or firmware, etc. stored on a machine accessible medium and executable by, for example, a processor system (e.g., the example processor system 710 of FIG. 7). When any of the appended claims are read to cover a purely software implementation, at least one of the network interface 402, the data interface 404, the route manager 406, the search interface 408, the route expiration interface 410, and/or the route update interface 412 is hereby expressly defined to include a tangible medium such as a memory, DVD, CD, etc.

The example apparatus 400 is provided with the network interface 402 to receive data packets from a CE router (e.g., the CE router 116 of FIG. 1) or a WAN (e.g., the WAN 118 of FIG. 1). In addition, the network interface 402 can forward data packets via local routes or remote routes to destination addresses. The example apparatus 400 is provided with the data interface 404 to identify and/or extract destination addresses from received data packets. In this manner, the example apparatus 400 can search for corresponding routes in, for example, an FIB (e.g., one of the FIBs 106a-e of FIG. 1) or an RIB (e.g., the RIB 108 of FIG. 1) to forward received data packets.

The example apparatus is provided with the route manager 406 to manage routes stored in the FIBs 106a-e and the RIB 108. For example, the route manager 406 can determine where routes should be stored based on their active/inactive status and when routes can be deleted from the FIBs 106a-e or overwritten when they are no longer active routes.

The example apparatus 400 is provided with the search interface 408 to search the FIBs 106a-e to determine whether routes corresponding to destination addresses associated with received data packets are active. In the illustrated example, the search interface 408 is also used to search the RIB 108 when routes are not found in the FIBs 106a-e. To perform these searches, the search interface 408 is configured to receive from the data interface 404 destination addresses of received data packets and compare the destination addresses to the destination addresses stored in the destination address columns 206 and 214 of FIG. 2.

The example apparatus 400 is provided with the route expiration interface 410 to determine when single-path remote routes (e.g., the single-path remote routes 226 of FIG. 2) stored in the FIBs 106a-e (FIGS. 1 and 2) are no longer active. In the illustrated example, the route expiration interface 410 is provided with one or more timers, counters, or clocks used to store timing values in the active timeout column 212 for each of the single-path remote route entries 226. In some example implementations, the route expiration interface 410 can be provided with a separate timer for each of the single-path remote route entries 226 that can be stored in the FIB 106a and can enable a timer for a particular entry any time a route is stored in that entry. In addition, any time the route in that entry is used to forwarded data, the route expiration interface 410 can zero or reset the timer. The route expiration interface 410 can monitor the timer to determine when it has exceeded a predetermined duration threshold corresponding to an inactive status. When the route expiration interface 410 detects that the timer for that entry has exceeded the duration threshold, the route expiration interface 410 can alert or notify the route manager 406. The route manager 406 can, in turn, delete the route from the FIB 106a or flag the route entry as inactive and overwriteable.

In other example implementations, the route expiration interface 410 may be provided with a single timer or clock. When a route is stored in one of the single-path remote route entries 226, the route expiration interface 410 can store a time value of the timer or clock from that instance in time in association with the route entry. The route expiration interface 410 can subsequently compare the stored time value with the value of its running timer or clock to determine when the route entry has exceeded a predetermined duration threshold corresponding to an inactive status. In addition, any time the route entry is used to forward data, the route expiration interface 410 can update the time value for that entry in the active timeout column 212 to the value of the timer or clock at the instance in time when the entry was used. In this manner, as in the above example, that route entry will remain under active status as long as it is used before its active timeout value relative to the timer or clock indicates a timeout. In yet other example implementations, the route expiration interface 410 can be provided with other alternative configurations to provide measurable criteria by which to determine when each of the single-path remote route entries 226 has expired to an inactive status. For example, other techniques may involve changing routes to inactive status based on elapsed processor clock cycles of the route processor 102 or elapsed numbers of data packets routed by the PE router 100 or any other measurable criteria.

The example apparatus 400 is provided with the route update interface 412 to update route entries in the FIBs 106a-e and/or the RIB 108 each time the PE router 100 (FIG. 1) receives updated route information to add valid routes or delete invalid routes. For example, when the PE router 100 receives new route information from the CE router 116 or from other PE routers via the WAN 118 of FIG. 1, the route update interface 412 can store new valid routes in the RIB 108. The new route information may include additional local or remote routes available to the PE router 100 or may indicate invalid routes no longer available and needing to be deleted from the routing tables (e.g., the FIBs 106a-e and RIB 108) of the PE router 100.

In addition to updating the RIB 108, the route update interface 412 is configured to determine whether any of the new or updated routes should also be stored in the FIBs 106a-e. For example, the route update interface 412 can be configured to determine whether any of the received routes is a local route or a multi-path route and, if so, the route update interface 412 can also store that route entry in the FIBs 106a-e. In addition, if the route update interface 412 determines that for any new route added to the RIB 108 for a particular destination prefix a native FIB entry for that destination prefix is already installed in the FIBs 106a-e, the route update interface 412 can update the FIBs 106a-e if the new route is a better route to the destination than the already stored native FIB entry.

Figure 5:
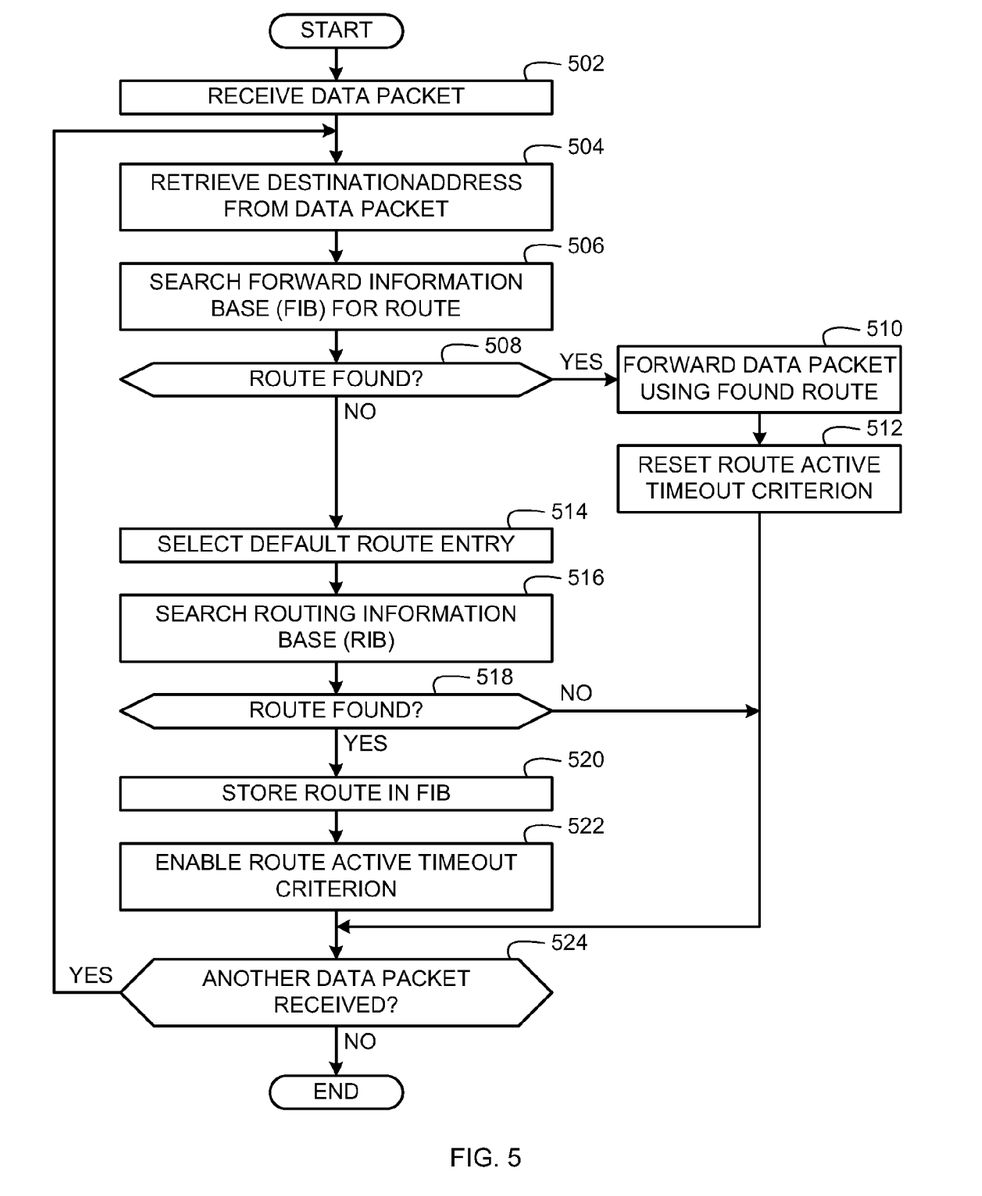
FIG. 5 is a flowchart representative of example machine readable instructions that may be executed to implement the example apparatus of FIG. 4 to dynamically store network routes in FIBs of the example PE router of FIG. 1.
Figure 6:
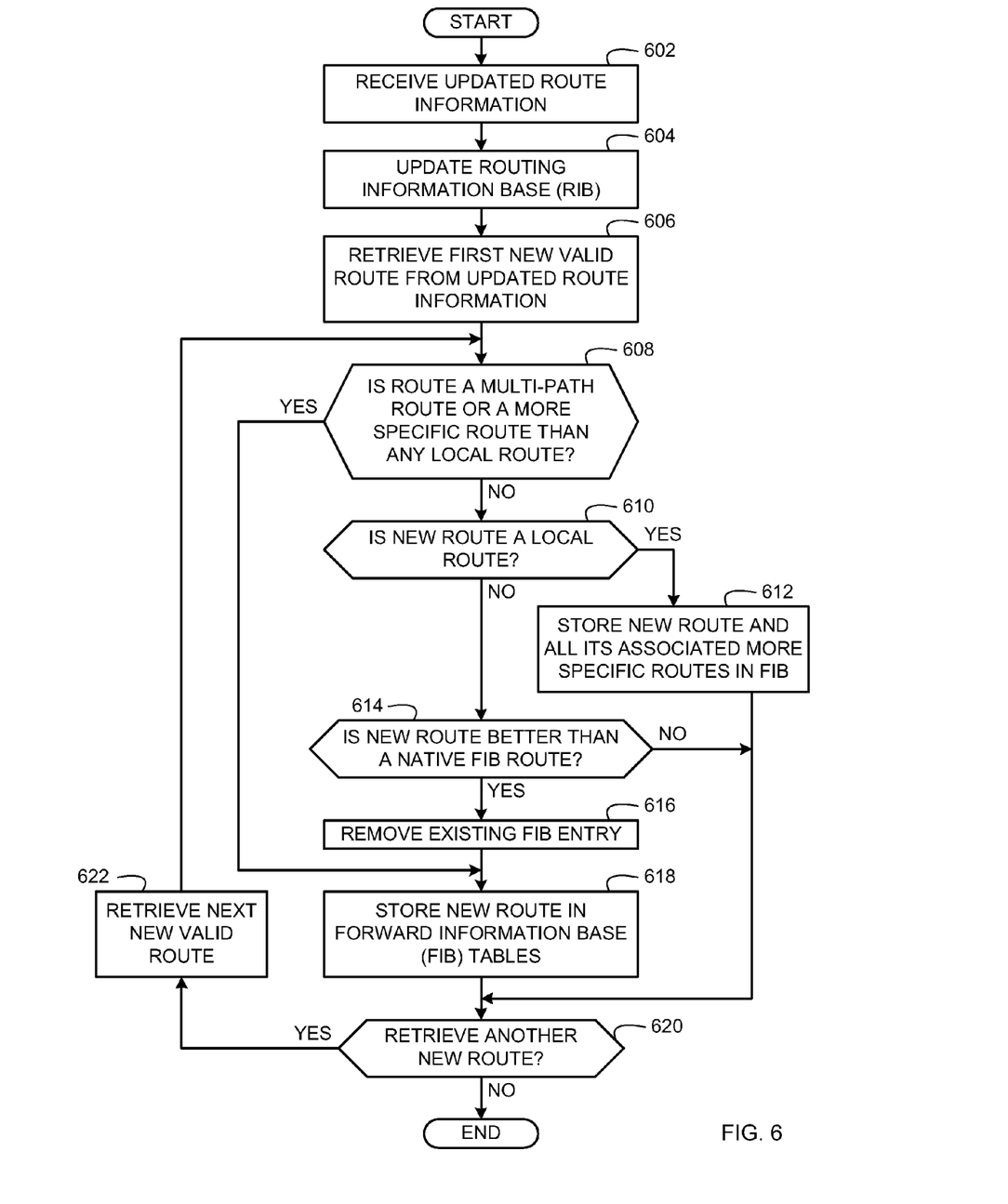
FIG. 6 is a flowchart representative of example machine readable instructions that may be executed to update route information in the example PE router of FIG. 1.

FIG. 5 is a flowchart representative of example machine readable instructions that may be executed to implement the example apparatus 400 of FIG. 4 to dynamically store network routes in the FIBs 106a-e (FIG. 1) to communicate data in a communication network. FIG. 6 is a flowchart representative of example machine readable instructions that may be executed to update route information in the PE router 100 (FIG. 1). The example processes of FIGS. 5 and 6 may be performed using a processor, a controller, and/or any other suitable processing device. For example, the example processes of FIGS. 5 and 6 may be implemented in coded instructions stored on a tangible medium such as a flash memory, a read-only memory (ROM), and/or a random-access memory (RAM) associated with a processor (e.g., the example processor 712 discussed below in connection with FIG. 7). Alternatively, one or both of the example processes of FIGS. 5 and 6 may be implemented using any combination(s) of application specific integrated circuit(s)(ASIC(s)), programmable logic device(s)(PLD(s)), field programmable logic device(s) (FPLD(s)), discrete logic, hardware, firmware, etc. Also, one or both of the example processes of FIGS. 5 and 6 may be implemented manually or as any combination(s) of any of the foregoing techniques, for example, any combination of firmware, software, discrete logic and/or hardware. Further, although the example processes of FIGS. 5 and 6 are described with reference to the flow diagrams of FIGS. 5 and 6, other methods of implementing the processes of FIGS. 5 and 6 may be employed. For example, the order of execution of the blocks may be changed, and/or some of the blocks described may be changed, eliminated, sub-divided, or combined. Additionally, one or both of the example processes of FIGS. 5 and 6 may be performed sequentially and/or in parallel by, for example, separate processing threads, processors, devices, discrete logic, circuits, etc.

The depicted example process of FIG. 5 is described in connection with the FIB 106a of the route processor 102 of FIG. 1. However, the example process may also be implemented by each of the line cards 112 of FIG. 1, in which case the line cards 112 would operate in connection with their respective ones of the FIBs 106b-e. Now turning in detail to FIG. 5, initially the network interface 402 (FIG. 4) receives a data packet (block 502). The data interface 404 (FIG. 4) retrieves the destination address from the data packet (block 504). For example, the data interface 406 can locate a field in the data packet that stores a destination internet protocol (IP) address and copy the destination address from that field.

The search interface 408 (FIG. 4) searches the forward information base 106a for a route entry associated with the identified destination address (block 506) based on destination addresses in the destination address column 206 (FIG. 2). A matching route entry may by any of the local route entries 220, the more-specific route entries 222, the multi-path route entries 224, or the single-path remote route entries 226 if it stores a destination address matching the destination address of the received data packet. If the search interface 408 determines that a matching route entry is stored in the FIB 106a (block 508), the route manager 406 (FIG. 4) selects the matching route entry for use in forwarding the received data packet (block 510) towards its destination address. In the illustrated example, the PE router 100 forwards the data packet via a unicast transport protocol using the matching route entry selected by the route manager 406.

The route expiration interface 410 (FIG. 4) resets a route active timeout criterion (e.g., in the route active timeout column 212 of FIG. 2) of the matching route entry (block 512). In this manner, the status of the route entry is kept as active by prolonging the amount of time before its timeout value expires to indicate an inactive status. For example, the route expiration interface 410 can reset a timer uniquely associated with the relevant route entry and/or update a corresponding predetermined duration value stored in the active timeout column 212 (FIG. 2) as discussed above. Of course, as discussed above in connection with FIG. 2, the active timeout criteria applies to the single-path remote routes 226, but it does not apply to the local routes 220, the more-specific routes 222, or the multi-path routes 224. Thus, if the matching route is not one of the single-path remote routes 226, the route expiration interface 410 would not reset an associated route active timeout value at block 512.

If at block 508, the search interface 408 determines that a matching route entry does not exist in the FIB 106a based on destination addresses in the destination address column 206 (FIG. 2), the route manager 406 (FIG. 4) selects the default FIB entry 218 (FIG. 2) to forward the data packet (block 514). As discussed above, when the default FIB entry 218 is selected, the PE router 100 is configured to encapsulate the data packet using a multicast transport protocol encapsulation and forward the data packet via network paths of a multicast distribution tree (e.g., the multicast distribution tree network 300 of FIG. 3) so that a receiving PE router to which the data packet is relevant (i.e., the PE router has a route entry for forwarding the data packet) will forward it to its destination address while other receiving PE routers to which the data packet is not relevant will discard or drop the packet.

The search interface 408 searches the RIB 108 for a route entry matching the destination address of the data packet (block 516). If the search interface 408 does not find a relevant route entry stored in the RIB 108 (block 518) based on destination addresses in the destination address column 214 (FIG. 2), the FIB table 106a is not updated with a route from the RIB 108.

If at block 518, the search interface 408 does find a relevant route entry stored in the RIB 108, the route manager 406 stores the relevant route entry in the FIB 106a (block 520). The route expiration interface 410 then enables the route active timeout criterion associated with the relevant route entry stored in the FIB 106a (block 522). For example, the route expiration interface 410 can start a timer uniquely associated with the relevant route entry and/or store a predetermined duration value for that entry in the active timeout column 212 (FIG. 2) as discussed above.

After the route active timeout criterion is enables (block 522) or if the search interface 408 does not find a relevant route entry in the RIB 108 (block 518) or after a route active timeout criterion is reset (block 512), the network interface 402 determines whether another data packet has been received (block 524). If a data packet has been received (block 524), control returns to block 504. Otherwise, the example process of FIG. 5 is ended. If a data packet is subsequently received at the network interface 402, an interrupt can be asserted to pass control to block 502, and the process of FIG. 5 can be repeated.

Turning now to the example route information update process of FIG. 6, initially the network interface 402 (FIG. 4) receives updated route information (block 602), and the route update interface 412 (FIG. 4) updates the RIB 108 (block 604). The route update interface 412 retrieves the first new valid route from the updated route information (block 606) and determines whether the new valid route is a multi-path route or a more specific route than a local route already stored in the FIB 106a (block 608). In the illustrated example, the route update interface 412 may determine the type of route of the new valid route based on the destination address and/or a route type identifier received in association with the new valid route.

If the route update interface 412 determines that the new valid route is not a multi-path route or a more specific route than a local route already stored in the FIB 106a (block 608), the route update interface 412 determines whether the new valid route is a local route (block 610). If the route update interface 412 determines that the new valid route is a local route (block 610), the route update interface 412 stores the route and all of its associated more specific routes in the FIB 106a (block 612).

If the route update interface 412 determines that the new valid route is not a local route (block 610), the route update interface 412 determines whether the new valid route is better than a native FIB entry having the same destination address prefix (block 614). For example, the route update interface 412 may determine which route entry is better based on one or more cost parameters including, for example, least number of hops, higher preference, lower cost metric, etc.

If the route update interface 412 determines that the new valid route is better than a native FIB route entry having the same destination address prefix (block 614), the route update interface 412 removes from the FIB 106a the existing FIB entry for which the new valid route is better (block 616).

If the route update interface 412 determines that the new valid route is a multi-path route or it is a more specific route to a local route already stored in the FIB 106a (block 608), or after the route update interface 412 removes from the FIB 106a the existing FIB entry for which the new valid route is better (block 616), the route update interface 412 stores the new valid route entry in the FIB 106a (block 618).

If another new valid route in the updated route information remains to be processed (block 620), the route update interface 412 can retrieve that next new valid route (block 622) and control can return to block 608 to process that new valid route. However, if no new valid routes in the updated route information remain to be processed (block 620), the example process of FIG. 6 is then ended.

FIG. 7 is a block diagram of an example processor system 710 that may be used to implement the example apparatus, methods, and articles of manufacture described herein. For example, processor systems substantially similar or identical to the example processor system 710 may be used to implement the PE router 100, the line cards 112, and/or the customer edge router 116 of FIG. 1. In addition, processor systems substantially similar or identical to the example processor system 710 may be used to implement the network interface 402, the data interface 404, the route manager 406, the search interface 408, the route expiration interface 410, and/or the route update interface 412 of the example apparatus 400 of FIG. 4.

As shown in FIG. 7, the processor system 710 includes a processor 712 that is coupled to an interconnection bus 714. The processor 712 may be any suitable processor, processing unit, or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. A chipset provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

In general, the system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

In the illustrated examples described herein, the system memory 724 may be implemented using a relatively fast memory such as an SRAM or TCAM to store the FIB 106a (or the FIBs 106b-e) of FIGS. 1 and 2. In addition, the mass storage memory 725 may be implemented using a relatively slower memory such as a DRAM to store the RIB 108 of FIGS. 1 and 2.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a digital subscriber line (DSL) modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible medium, such as: a magnetic medium (e.g., a disk or tape); a magneto-optical or optical medium such as a disk; or a solid state medium such as a memory card or other package that houses one or more read-only (non-volatile) memories, random access memories, or other re-writeable (volatile) memories. Accordingly, the example software and/or firmware described herein can be stored on a tangible medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method of dynamically storing network routes, comprising:
   receiving first data via a router having a first memory to store active routes and a second memory to store inactive routes;
   identifying a destination address associated with the first data; and
   in response to detecting that no destination address entry stored in the first memory matches the destination address associated with the first data, selecting a default route stored in the first memory to forward the first data using a multicast transport protocol.

2. A method as defined in claim 1, wherein in response to detecting that no destination address entry stored in the first memory matches the destination address associated with the first data, the method further comprises:
retrieving from the second memory a first route corresponding to the destination address; and
storing the first route in the first memory.

3. A method as defined in claim 2, further comprising providing a criterion to indicate when the first route stored in the first memory is to become inactive.

4. A method as defined in claim 3, further comprising, when the first route becomes inactive, at least one of deleting the first route from the first memory or overwriting the first route in the first memory with a second route associated with another destination address of second data.

5. A method as defined in claim 1, wherein the destination address is an internet protocol address.

6. A method as defined in claim 1, wherein the first memory implements a forwarding information base data structure, and wherein the second memory implements a routing information base data structure.

7. An apparatus to dynamically store network routes, the apparatus comprising:
a first memory to store active routes;
a second memory to store inactive routes;
a data interface to receive first data and identify a destination address associated with the first data; and
a route manager to select a default route stored in the first memory to forward the first data using a multicast transport protocol in response to determining that no destination address entry stored in the first memory matches the destination address associated with the first data.

8. An apparatus as defined in claim 7, wherein in response to detecting that no destination address entry stored in the first memory matches the destination address associated with the first data, the route manager is further to:
retrieve from the second memory a first route corresponding to the destination address;
store the first route in the first memory; and
select the first route to forward second data associated with the destination address.

9. An apparatus as defined in claim 8, further comprising a route expiration interface to provide a criterion to indicate when the first route stored in the first memory is to become inactive.

10. An apparatus as defined in claim 9, wherein, when the first route becomes inactive, the route manager is further to at least one of delete the first route from the first memory or overwrite the first route in the first memory with a second route associated with another destination address of third data.

11. An apparatus as defined in claim 7, wherein the first memory implements a forwarding information base data structure, and wherein the second memory implements a routing information base data structure.

12. A tangible machine accessible medium having instructions stored thereon that, when executed, cause a machine to at least:
receive first data via a router having a first memory to store active routes and a second memory to store inactive routes;
identify a destination address associated with the first data; and
in response to detecting that no destination address entry stored in the first memory matches the destination address associated with the first data, select a default route stored in the first memory to forward the first data using a multicast transport protocol.

13. A machine accessible medium as defined in claim 12 having instructions stored thereon that, when executed, cause the machine to, in response to detecting that no destination address entry stored in the first memory matches the destination address associated with the first data:
retrieve from the second memory a first route corresponding to the destination address; and
store the first route in the first memory.

14. A machine accessible medium as defined in claim 13 having instructions stored thereon that, when executed, cause the machine to provide a criterion to indicate when the first route stored in the first memory is to become inactive.

15. A machine accessible medium as defined in claim 14 having instructions stored thereon that, when executed, cause the machine to, when the first route becomes inactive, at least one of delete the first route from the first memory or overwrite the first route in the first memory with a second route associated with another destination address of second data.

16. A machine accessible medium as defined in claim 12, wherein the first memory implements a forwarding information base data structure, and wherein the second memory implements a routing information base data structure.

17. A method of routing data in a communication network, comprising:
receiving via a router a first data packet associated with a first destination address;
when no destination address entry stored in a first memory of the router matches the first destination address associated with the first data packet, selecting a default route to communicate the first data packet via a multicast transport protocol;
retrieving a second route associated with the first destination address from a second memory of the router;
storing the second route in the first memory;
receiving via the router a second data packet associated with the first destination address; and
selecting the second route from the first memory to communicate via the router the second data packet via a unicast transport protocol.

* * * * *

UNITED STATES PATENT AND TRADEMARK OFFICE
CERTIFICATE OF CORRECTION

PATENT NO.        : 7,936,754 B2                                                   Page 1 of 1
APPLICATION NO.   : 12/333949
DATED             : May 3, 2011
INVENTOR(S)       : Maria Napierala It is certified that error appears in the above-identified patent and that said Letters Patent is hereby corrected as shown below:

Column 14, lines 60 (claim 1): between "routes" and ";" insert -- , wherein a data access speed of the first memory is relatively faster than a data access speed of the second memory --

Column 15, line 25 (claim 7): between "routes" and ";" insert -- , wherein a data access speed of the first memory is relatively faster than a data access speed of the second memory --

Column 16, line 6 (claim 12): between "routes" and ";" insert -- , wherein a data access speed of the first memory is relatively faster than a data access speed of the second memory --

Column 16, line 45 (claim 17): before "retrieving" insert -- after initiating communication of the first data packet via the multicast transport protocol, --

Signed and Sealed this
Eleventh Day of September, 2012

David J. Kappos
*Director of the United States Patent and Trademark Office*